May 14, 1968  T. N. THIELE  3,383,561
PULSE WIDTH MODULATION CONTROL SYSTEM
Filed April 4, 1966
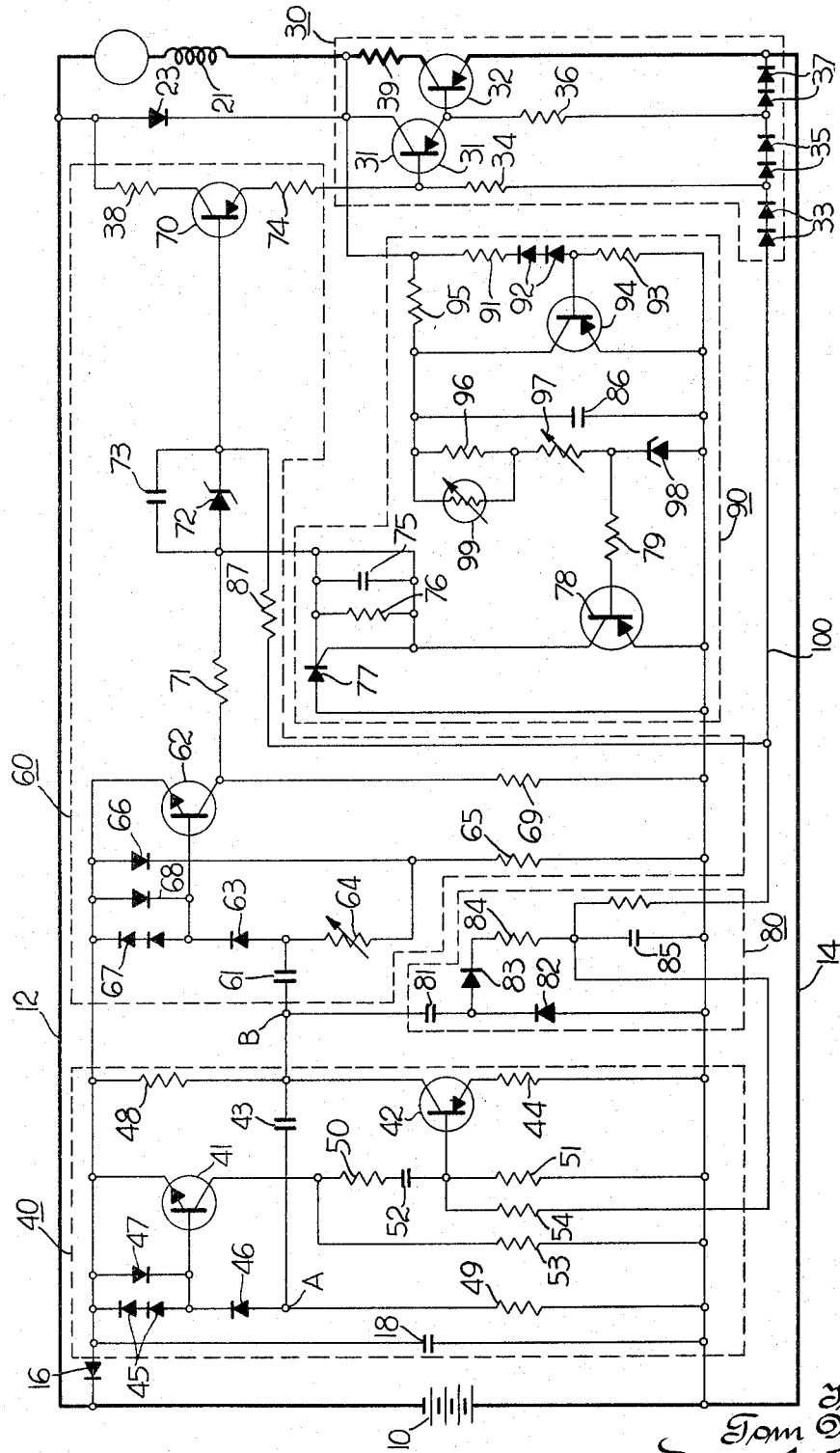
Inventor
Tom N. Thiele
By R J Falkowski
Attorney United States Patent Office 3,383,561
Patented May 14, 1968

3,383,561
PULSE WIDTH MODULATION CONTROL SYSTEM
Tom N. Thiele, Milwaukee, Wis., assignor to Allis-Chalmers Manufacturing Company, Milwaukee, Wis.
Filed Apr. 4, 1966, Ser. No. 539,930
10 Claims. (Cl. 317—13)

This invention relates to current limiting means for systems that control a direct current motor, particularly it relates to a current limiting means for systems that use pulse modulation to control the effective electrical energy delivered to a direct current motor.

One common way to control the operation of a direct current motor from a power source, such as a battery or a fuel cell, is to connect a resistance in series with the motor and the power source. Control of the effective voltage delivered to the motor is accomplished by varying the resistance. This, however, wastes power through the resistor at less than maximum output. Therefore, systems have been devised that produce pulses to rapidly turn a switch on for varying percentages of time to vary the total effective electrical power delivered to the motor.

A system embodying this invention comprises a direct current motor powered by a direct current power source and a pulse modulation control means that rapidly and cyclically turns a switching means off and on to vary the effective electrical power delivered to the motor. Means are provided to produce a potential greater than that of the power source for reverse biasing of certain semiconductor circuits in the system. The system includes a current limiting means that operates automatically to substantially instantaneously disconnect the source from the motor whenever the instantaneous current in the power circuit reaches an undesirable level.

This invention generally comprises means for responding to the current in the power system by measuring the voltage across the low resistance of the power switching means only during the short periods that the power switching means is turned on.

The objects of this invention are to provide a new and improved motor control system; to provide a new and improved pulse modulation control system for direct current motors; to provide a pulse width modulation control system for a direct current motor utilizing a semiconductor power switch in the power circuit; to provide an improved pulse modulation system that includes current limiting for controlling a direct current motor; to provide an improved current limiting system for a pulse modulation control system for a direct current motor; and to provide a current limiting system that is responsive to the voltage variations across a low resistance power switch only when the power switch is turned on.

Other objects and advantages will be apparent from the following detailed description of an embodiment of this invention.

The figure is a schematic drawing of a motor and pulse width modulation control system embodying this invention.

Referring to the figure, a direct current source, such as a battery 10, supplies current to a motor 20 having a field winding 21 along a negative conductor 12 and a positive conductor 14. A timing source, such as an oscillator 40, produces a periodic reference signal. The reference signal is received by a pulse control means, such as pulse width modulation circuit 60, and by a means for producing a potential greater than the source potential, such as a bias generating circuit 80. Pulse width modulation circuit 60 provides a switching control signal for controlling a power switching means, such as a power transistor switching circuit 30, to cyclically connect source 10 to motor 20 for selectable periodic intervals, and bias generating circuit 80 provides a voltage greater than the source voltage for biasing circuits as required. A current limiting means, such as a current limiting circuit 90, is provided to limit the motor current during operation to prevent overheating of and damage to the components of the control system.

Oscillator 40 is an astable complementary multivibrator designed to provide an accurate timed output as a reference signal over wide variations of source voltage. Oscillator 40 is connected to source 10 across a decoupling capacitor 18 and a decoupling diode 16.

In the operation of oscillator 40, assuming that transistors 41 and 42 have just turned off and a capacitor 43 is charged, capacitor 43 begins discharging through a resistor 49. During the discharging of capacitor 43, terminal A goes from a potential more negative than the potential of negative conductor 12 toward the voltage of positive conductor 14. When point A becomes sufficiently positive relative to conductor 12, current flows through a diode 46 and through the base-emitter junction of transistor 41 and transistor 41 turns on.

When transistor 41 conducts, current flows through the emitter-collector circuit of transistor 41, through a resistor 53, through a resistor 50, through a resistor 44, and through the base-emitter junction of transistor 42 to charge a capacitor 52. The current that charges capacitor 52 produces a potential between the base and emitter of transistor 42 and transistor 42 turns on and remains on as long as the current continues.

When transistor 42 is turned on, point B is at the potential, appearing across a resistor 48, of positive conductor 14, and capacitor 43 charges through the base-emitter junction of transistor 41, diode 46, the emitter-collector circuit of transistor 42, and resistor 44. A diode 47 and diodes 45 connected to the base of transistor 41 are used primarily to bypass transient pulses around transistor 41 and a resistor 51 connected to the base of transistor 42 provides biasing voltage for transistor 42.

When capacitor 52 becomes substantially fully charged, current substantially ceases and transistor 42 turns off. When transistor 42 turns off, capacitor 43 is at the initially assumed condition when point B is at the negative potential of the source and point A is still more negative. This makes the base of transistor 41 more negative than its emitter and transistor 41 turns off. Capacitor 43 then again begins to discharge until point A becomes sufficiently positive to turn on transistor 41 and the cycle begins again.

The output at point B is a rectangular pulse with the positive portion, or "on" period of transistor 42, determined by the time constant of the charging circuit of capacitor 52; and its negative, or "off" period of transistor 42, determined by the time constant of resistor 49 and capacitor 43. In the type of application disclosed the time constants are selected to provide a very short positive pulse, about one-fiftieth of the time of the negative pulse.

The output pulse appearing at point B is received by pulse width modulation circuit 60. During the period of the positive pulse at point B, a capacitor 61 is charged and as it is being charged, current flows through the base-emitter junction of a transistor 62 and through a diode 63 keeping transistor 62 turned on. This occurs at the beginning of each cycle for the short period of time of the positive pulse. When point B becomes negative, current no longer flows through the base-emitter junction of transistor 62 and transistor 62 turns off because the negative charge on capacitor 61 reverse biases and turns off diode 63. Capacitor 61 then begins discharging through a control device, such as a potentiometer 64, and a resistor 65. When capacitor 61 has discharged sufficiently to forward bias diode 63, transistor 62 turns on. The rate of discharge of capacitor 61 is varied by the setting of potentiometer 64. If the setting provides a low resistance, capacitor 61 discharges rapidly and transistor 62 is turned on after a very short "off" interval and maximum duty cycle is obtained.

A diode 66 is connected across potentiometer 64 to increase the available maximum output duty cycle, or "on" time of transistor 62. Diode 66 is necessary because the use of resistor 65, which is necessary to limit the base current through transistor 62, also slows the discharge of capacitor 61 and increases the minimum operable discharge time of capacitor 61. To compensate for this, diode 66 is added to allow capacitor 63 to discharge through diode 66 while at the same time allowing the use of resistor 65 to protect transistor 62 from excess current. With the proper setting of timing circuit 40, 98 to 99% duty cycle, or "on" time, can be obtained. Diodes 67 and 68 are provided to protect transistor 62 from transient pulses.

When transistor 62 turns on its collector becomes negative across a resistor 69, and this makes the base of a transistor 70 negative relative to its emitter and current flows through a resistor 71, a Zener diode 72, the base-emitter junction of transistor 70, a resistor 74, and the base-emitter junctions of transistors 31 and 32. This turns on transistor 70. A collector resistor 38 is connected in the collector circuit of transistor 70; Zener diode 72 is connected to prevent the base of transistor 70 from being connected to the positive terminal of the source through current limiting circuit 90 when a thyristor 77 is turned on; and a capacitor 73 is connected to allow current to immediately flow to increase speed of response of turning on of transistor 70.

The turning on of transistor 70 turns on the modified Darlington circuit of switching circuit 30 which comprises driving transistor 31 and power transistor 32 and current flows from positive conductor 14 primarily through the emitter-base junctions of transistors 32 and 31, the emitter collector circuit of transistor 70, and resistors 74 and 38 to negative conductor 12. A resistor 39 is connected between the collectors of transistors 31 and 32 to assure full forward biasing and maximum conductance of transistor 32. In most practical applications, switching means 30 would consist of several parallelly connected switching circuits.

The output at point B is also applied to bias generating circuit 80. During the period that transistor 42 is turned off, a capacitor 81 is charged through a diode 82 and resistor 48. When transistor 42 turns on, point B becomes positive and the upper negatively charged plate of capacitor 81 is connected to positive conductor 14 through transistor 42 and resistor 44. Capacitor 81 discharges through a diode 83 and a resistor 84 into a capacitor 85. Diode 82 prevents discharge of capacitor 81 other than into capacitor 85, and allows capacitor 81 to charge during the charging, or "off," period of transistor 42. The upper plate of capacitor 85 therefore is quickly charged to a potential more positive than the positive terminal of source 10 and is prevented from discharging by diode 83.

The positive plate of capacitor 85 is connected through a resistor 54 to the base of transistor 42 to provide reverse biasing potential for transistor 42, and is connected through a resistor 88 to provide reverse biasing voltage across the diode voltage divider of diodes 33, 35 and 37 between a positive conductor 100 and positive conductor 14. When transistors 70, 31 and 32 are turned off, the positive potential across diodes 33 reverse biases transistor 70; the positive potential across diodes 35 reverse biases transistor 31; and the positive potential across diodes 37 reverse biases transistor 32. The reverse biasing of transistors 70, 31 and 32 when they are turned off by a positive potential greater than that available from the battery assures a minimum leakage current.

The width of each turned on pulse of switching circuit 30 is determined by the setting of potentiometer 64 which selects the time after the end of each positive pulse at point B that switching circuit 30 is again turned on. After turning on, switching circuit 30 remains on until the end of the next positive pulse at point B. Since under some operating conditions the current during the "on time" may rise to an excessive level, a current limiting means 90 is provided to turn off switching means 30 before the cyclic reoccurrence of the end of the positive pulse at point B, if necessary.

Current limiting means 90 comprises means for providing a measure of the voltage across power switching means 30. This means for providing a measure of the voltage comprises a measuring circuit including a resistor 95, a resistor 96, a potentiometer 97, a tunnel diode 98, a thermistor 99 and a capacitor 86. A sensing means comprising a sensing transistor 78 and a resistor 79 responds to the measure of the voltage taken at a point in the measuring circuit and provides an output signal when the measure exceeds a preselected voltage indicating excessive current in the power circuit.

A means responsive to the output signal of the sensing means is provided by a gate controlled rectifier, such as a thyristor 77, and its associated circuitry to reverse bias transistor 70 to change the condition of pulse width modulation circuit 60 and turn off the switching means.

The current limiting means also comprises a deactivating means for making the sensing means inoperative when the voltage across the switching means is above a predetermined level indicating that the switching means is in an "off" condition. The deactivating means comprises a shunting transistor 94 that responds to a measure of the voltage across the switching means as it appears across a resistance circuit including a resistor 91, diodes 92, and a resistor 93.

In the operation of the current limiting means, transistor 94 responds to the measure of the potential appearing at its base. When switching means 30 is turned on this potential is low and there is not sufficient drive current to the base of transistor 94 to turn it on, but when switching means 30 is turned off the voltage across resistor 93 provides sufficient current to turn on transistor 94 and short out the sensing means so that no voltage appears at the base of transistor 78.

With transistor 94 turned off (switching means 30 is on), current flows through the measuring circuit of resistor 95, resistor 96, potentiometer 97, and tunnel diode 98. Thermistor 99 is connected in parallel with resistor 96 and along with tunnel diode 98 provides temperature compensation for the circuit. A capacitor 86 provides rapid response time. As the current through switching circuit 30 increases when switching circuit 30 is turned on, the potential at the base of a transistor 78 becomes proportionally more negative. When this potential reaches a preselected level determined by the adjustment of potentiometer 97, indicating excessive current in the power system, tunnel diode 98 is switched from a low conduction state to a high conduction or "on" state to effect current flow through resistor 79 to turn on transistor 78.

When transistor 78 turns on, it provides an output signal to thyristor 77 as positive conductor 14 is connected to the gate terminal of thyristor 77 and a positive gating voltage appears across a resistor 76 and a capacitor 75 to turn on a thyristor 77. This connects the base of transistor 70 to positive conductor 14 and instantaneously turns off transistor 70 and switching circuit 30, thereby shortening the length of the "on" pulse.

Thyristor 77 turns off at the end of the next positive pulse at point B when transistor 62 is reverse biased by charged capacitor 61. With transistor 62 turned off, the potential of negtaive conductor 60 is removed from the cathode of thyristor 77 and thyristor 77 is no longer forward biased and turns off.

In describing the invention, the preferred embodiment has been shown and described, but it is obvious to one skilled in the art that there are many variations, combinations, alterations and modifications that may be made without departing from the spirit of the invention, or from the scope of the appended claims.

The embodiments of the invention in which an exclusive property or privilege is claimed are defined as follows:

1. Current limiting means for a control system that cyclically connects a direct current source to a direct current motor to provide a variable average current to said motor, said means comprising:

power switching means connected between the source and the motor;

pulse modulation control means for controlling the power switching means by providing selectably variable pulses delivered to turn on said power switching means for the duration of the pulse;

means connected across the power switching means for providing a continuous measure of the voltage across said power switching means;

sensing means responsive to the measure of the voltage for providing an output signal when the instantaneous level of said voltage exceeds a first preselected level indicating an instantaneous overcurrent condition;

means connected to the sensing means and responsive to the voltage across the switching means for deactivating said sensing means when the voltage across the switching means is above a second predetermined level greater than the first preselected level and selected to indicate that said switching means is open; and means responsive to the output signal for controlling the pulse modulation control means to effect instantaneous turn-off of the switching means.

2. Current limiting means according to claim 1 wherein said sensing means comprises a sensing transistor connected to turn on to produce the output signal when the voltage across the switching means exceeds the first preselected level.

3. Current limiting means according to claim 2 wherein said means for providing a measure of the voltage comprises a measuring circuit connected across and in parallel with the power switching means and said sensing transistor is connected to turn on to produce the output signal when the voltage at a selected point of said measuring circuit exceeds a selected level related to the first preselected level.

4. Current limiting means according to claim 3 wherein said means for deactivating comprises a shunting transistor connected to respond to the voltage across the switching means with the shunting transistor output circuit connected across the measuring circuit to shunt the measuring circuit when turned on.

5. Current limiting means according to claim 4 wherein said shunting transistor is connected to respond to the voltage at a selected point on a resistance circuit connected across the power switching means.

6. Current limiting means according to claim 5 wherein said means responsive to the output signal comprises a gate controlled rectifier connected to be gated on by the output signal and thereby change the condition of the pulse control means and wherein said gate controlled rectifier is connected to turn off after each pulse.

7. Current limiting means according to claim 3 wherein said measuring circuit comprises a tunnel diode connected between the base and emitter of the sensing transistor with said tunnel diode connected and said measuring circuit characteristics selected to switch said tunnel diode from its low conduction state to its high conduction to permit current flow through said sensing transistor to turn on said sensing transistor.

8. Current limiting means according to claim 1 wherein said means for deactivating comprises a shunting transistor connected to respond to the voltage across the switching means with the shunting transistor output circuit connetced to shunt the measure of the voltage when turned on.

9. Current limiting means according to claim 8 wherein said means responsive to the output signal comprises a gate controlled rectifier connected to be gated on by the output signal and thereby change the condition of the pulse control means and wherein said gate controlled rectifier is connected to turn off after each pulse, and wherein said sensing means comprises a sensing transistor connected to turn on to produce the output signal when the voltage exceeds the first preselected level.

10. Current limiting means according to claim 1 wherein said means responsive to the output signal comprises a gate controlled rectifier having its gate connected to receive the output signal as a positive gating voltage and wherein said gate controlled rectifier is connected to turn off after each pulse.

References Cited

UNITED STATES PATENTS

| 3,132,287 | 5/1964 | Yarbrough | 317—33 |
| 3,262,017 | 7/1966 | Ashenden et al. | 317—33 |
| 3,295,020 | 12/1966 | Borkovitz | 317—33 |
| 3,334,272 | 8/1967 | Lipnitz | 317—33 |

MILTON O. HIRSHFIELD, *Primary Examiner.*

J. D. TRAMMELL, *Assistant Examiner.*